United States Patent
Kim et al.

(10) Patent No.: US 8,319,902 B2
(45) Date of Patent: Nov. 27, 2012

(54) 2D/3D SWITCHABLE INTEGRAL IMAGING SYSTEMS

(75) Inventors: Sun-il Kim, Seoul (KR); Jong-min Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 276 days.

(21) Appl. No.: 12/654,701

(22) Filed: Dec. 29, 2009

(65) Prior Publication Data

US 2010/0208152 A1   Aug. 19, 2010

(30) Foreign Application Priority Data

Feb. 18, 2009   (KR) .................. 10-2009-0013503

(51) Int. Cl.
*G02F 1/1335* (2006.01)

(52) U.S. Cl. .......................................................... 349/15

(58) Field of Classification Search ...................... 349/15
See application file for complete search history.

(56) References Cited

U.S. PATENT DOCUMENTS

| | | | |
|---|---|---|---|
| 7,811,667 B2 * | 10/2010 | Shin et al. ........................ | 428/408 |
| 2011/0299044 A1 * | 12/2011 | Yeh et al. ......................... | 353/52 |

FOREIGN PATENT DOCUMENTS

| | | |
|---|---|---|
| JP | 2007-150536 | 6/2007 |
| JP | 2008-015395 | 1/2008 |

OTHER PUBLICATIONS

"Patterned multiwall carbon nanotube electrode arrays for liquid crystal photonic devices" T.D. Wilikinson et al., Proc. of SPIE, vol. 6988, 2008.
"Depth-enhanced three dimensional-two-dimensional convertible display based on modified integral imaging", Jae-Hyeung Park et al., Optics Letters, vol. 29, No. 23, Dec. 2004.
"Simulation of 3D images in 3D/2D convertible integral imaging system", The Optical Society of Korea Summer Meeting 2006.

\* cited by examiner

*Primary Examiner* — Timothy L Rude
(74) *Attorney, Agent, or Firm* — Harness, Dickey & Pierce, PLC

(57) ABSTRACT

An integral imaging system may include a lens unit. The lens unit may include a first substrate; a second substrate; a first electrode on the first substrate; a second electrode on the second substrate; a liquid crystal layer between the first and second substrates; and an array of nanostructures protruding from the first substrate into the liquid crystal layer. The first and second electrodes may be configured to apply one or more voltages to the array of nanostructures. When the one or more voltages are applied to the array of nanostructures, one or more electric fields may be formed between the array of nanostructures and the second electrode, varying an arrangement of molecules in the liquid crystal layer and forming a refractive index distribution in the liquid crystal layer.

20 Claims, 4 Drawing Sheets

2D/3D SWITCHABLE INTEGRAL IMAGING SYSTEMS

CROSS-REFERENCE TO RELATED APPLICATIONS

This application claims priority from Korean Patent Application No. 10-2009-0013503, filed on Feb. 18, 2009, in the Korean Intellectual Property Office (KIPO), the entire contents of which are incorporated herein by reference.

BACKGROUND

1. Field

Example embodiments relate to two dimensional (2D)/three dimensional (3D) switchable integral imaging systems capable of displaying 3D images and/or 2D images.

2. Description of the Related Art

Recently, stereoscopic image display apparatuses may have been used in various fields such as medical imaging, games, advertisements, education, military applications, etc. Methods of displaying stereoscopic images such as holographic methods, stereoscopic methods, integral imaging methods, and so forth may be being researched.

In holographic methods, when a light beam is illuminated onto a hologram, the observer who is in front of the hologram at a predetermined distance from the hologram may see a virtual three dimensional (3D) image. In holographic methods, by seeing a hologram manufactured using a coherent light source such as a laser, a virtual stereoscopic image, that may look the same as an actual object, may be seen without using special glasses. Thus, holographic methods may be regarded as ideal in that a good 3D effect may be obtained and/or a 3D image may be seen without fatigue. However, holographic methods may use a coherent light source and/or may have difficulty in realizing a large object located at a long distance. Also, due to the large amount of data involved, it may be difficult to transmit and/or reproduce images in real-time using holographic methods. Thus, practical applications of holographic methods may be limited.

In stereoscopic methods, two separate two dimensional (2D) images may be respectively shown to the eyes of a person in order to obtain a 3D effect. In stereoscopic methods, two plane images may be used and, thus, a 3D image having high resolution and/or a large depth may be displayed. Stereoscopic methods may be classified into glasses-type methods, in which polarization and/or a shutter may be used in order to see the images separated for each eye, and non-glasses-type methods, in which images may be separated directly on a display unit in order to create a viewing zone. Examples of the non-glasses-type display methods may include parallel-barrier-type display methods and/or lenticular-type display methods.

In stereoscopic methods, systems may be constructed using a flat panel display and/or relatively simple optical components. Thus, slim 3D displays may be realized. However, since left and right images may be formed on one screen, the resolution of the images may be reduced by a half or more, and/or visual fatigue may be generated due to a difference in parallax between the two images shown to the eyes of a person and the focusing capability of the person. Thus, it may be difficult to see a 2D image due to the structure of the system using stereoscopic methods.

In integral imaging methods, image information that is transmitted from an object using a lens array may be stored as an integral image that includes a number of unit images, and/or the integral image may be reconstructed using a lens array to reproduce the whole information of the object. Integral imaging methods may have been suggested by Lippmann in 1908. However, integral imaging methods may not have been observed much in the past due to limitations in imaging devices and/or display devices, but may have been researched more recently with the development of high resolution imaging devices and/or high resolution displays. Integral imaging devices may not require glasses and/or other elements in order to observe a stereo image, and/or may provide continuous horizontal and/or vertical parallax not only at a viewpoint (that may or may not be predetermined), but within a viewing angle (that may or may not be predetermined). Thus, an image may be continuously realized without visual fatigue. Thus, integral imaging methods may be being researched more in recent times.

However, since a lens array having a fixed focal point may be used in integral imaging methods, image information obtained from an object may be distorted according to positions and may be recorded in that manner, so integral imaging methods may only be used to display 3D images.

SUMMARY

Example embodiments may include a two dimensional (2D)/three dimensional (3D) switchable integral imaging system that is capable of recording image information from an object without distortion according to positions, reproducing the recorded image information without distortion by actively varying a focal point of a lens array, and/or displaying 2D images as well.

Additional aspects will be set forth in part in the description which follows and, in part, will be apparent from the description, and/or may be learned by practice of example embodiments.

To achieve the above and/or other aspects, example embodiments may include an integral imaging system including a lens unit (the lens unit may be planar), wherein the lens unit may include: first and second substrates; a liquid crystal layer filled between the first and second substrates; an array of nanostructures grown to protrude over at least one of the first and second substrates; and/or first and second electrodes respectively formed on the first and second substrates to apply a voltage to the array of the nanostructures. The lens unit may be formed as a lens array having a two dimensional (2D) arrangement when an electrical field is formed by a voltage applied to the array of the nanostructures and/or an arrangement of liquid crystal molecules may be varied according to the electrical field and/or may form a refractive index distribution.

The lens array may be switched, by applying, or not applying, a voltage to the first and second electrodes, wherein a three dimensional (3D) image may be formed when a voltage is applied to the array of nanostructures, and/or a 2D image may be formed when no voltage is applied to the array of nanostructures.

Variation values of the refractive index may be adjusted by adjusting voltages applied to the nanostructures in order to form a lens array with optimum focal lengths according to positions of an object or objects from the lens array.

The nanostructures may include multiwall carbon nanotubes (MWCNT) and/or metal nanotips.

At least one of the first and second electrodes may be formed to individually adjust voltages applied to each of the nanostructures, so that a lens array may be formed with optimum focal lengths according to positions of an object or objects from the lens array.

According to example embodiments, a lens unit (the lens unit may be planar) may be used as a lens array having a 2D lens arrangement, wherein a focal point of the lens array also may be actively varied, thereby recording image information from an object according to positions without distortion and/or reproducing the recorded image information without distortion as a 3D image. Also, the lens unit may be controlled to function, or not function, as a lens array by applying, or not applying, a voltage to the lens unit. Thus, not only 3D images, but also 2D images may be displayed.

An integral imaging system may comprise a lens unit. The lens unit may include a first substrate; a second substrate; a first electrode on the first substrate; a second electrode on the second substrate; a liquid crystal layer between the first and second substrates; and/or an array of nanostructures protruding from the first substrate into the liquid crystal layer. The first and/or second electrodes may be configured to apply one or more voltages to the array of nanostructures. When the one or more voltages are applied to the array of nanostructures, one or more electric fields may be formed between the array of nanostructures and the second electrode, varying an arrangement of molecules in the liquid crystal layer and/or forming a refractive index distribution in the liquid crystal layer.

An integral imaging system may comprise a lens unit. The lens unit may include a first substrate; a second substrate; a first electrode on the first substrate; a second electrode on the second substrate; a liquid crystal layer between the first and second substrates; a first array of nanostructures protruding from the first substrate into the liquid crystal layer; and/or a second array of nanostructures protruding from the second substrate into the liquid crystal layer. The first and/or second electrodes may be configured to apply one or more voltages to the first or second array of nanostructures. When the one or more voltages are applied to the first or second array of nanostructures, one or more electric fields may be formed between the first array of nanostructures and the second electrode or between the second array of nanostructures and the first electrode, varying an arrangement of molecules in the liquid crystal layer and/or forming a refractive index distribution in the liquid crystal layer.

An integral imaging system may comprise a lens unit. The lens unit may include a first substrate; a second substrate; a first electrode on the first substrate; a second electrode on the second substrate; a liquid crystal layer between the first and second substrates; a first array of nanostructures protruding from the first substrate into the liquid crystal layer; and/or a second array of nanostructures protruding from the second substrate into the liquid crystal layer. The first and/or second electrodes may be configured to apply one or more voltages to the first and second arrays of nanostructures. When the one or more voltages are applied to the first and second arrays of nanostructures, one or more electric fields may be formed between the first array of nanostructures and the second array of nanostructures, varying an arrangement of molecules in the liquid crystal layer and/or forming a refractive index distribution in the liquid crystal layer.

BRIEF DESCRIPTION OF THE DRAWINGS

The above and/or other aspects and advantages will become apparent and more readily appreciated from the following detailed description of example embodiments, taken in conjunction with the accompanying drawings, in which.

DETAILED DESCRIPTION

Figure 1:
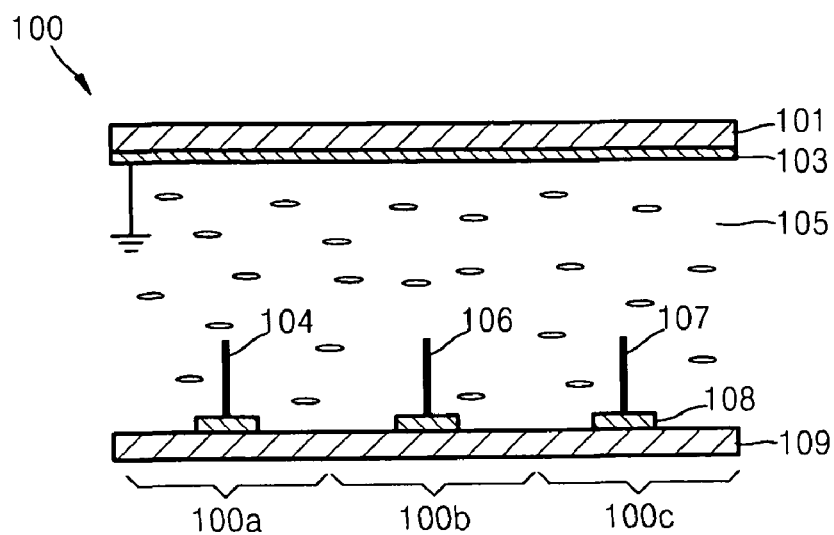
FIG. 1 is a schematic view illustrating a lens unit used in an integral imaging system according to example embodiments.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions are exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

An integral imaging system for performing integral imaging may include two units, that is, an elemental image producing unit and/or a display unit. An integral imaging system according to example embodiments may include only an elemental image producing unit or only a display unit, or both an elemental image producing unit and a display unit.

Hereinafter, for convenience of description, an integral imaging system including both an elemental image producing unit and a display unit according to example embodiments will be described.

The elemental image producing unit may include a lens array for forming an elemental image of a three dimensional (3D) object and/or an imaging device for storing the elemental image formed by the lens array. The display unit may include a display device that may display the elemental image obtained by the elemental image producing unit and/or a lens array that may reproduce the elemental image displayed on the display device as a 3D image. The lens arrays may have a structure in which a number of unit lenses are arranged two-dimensionally in order to realize integral imaging technology.

In the integral imaging system, an elemental image of an object may be obtained using the elemental image producing unit, and/or the elemental image may be output to the display unit so that a user may see a 3D image. The elemental image may refer to a two dimensional (2D) elemental image behind a lens array and/or allows a user to see a 3D image. The elemental image may be actually generated using a camera and/or a lens array and/or may be generated using computer graphics.

The elemental image producing unit may generate 2D elemental images of an object seen from various directions and/or may store the images. The lens array may form elemental images of the object using the unit lenses of the lens array. The imaging device may store the elemental images of the object formed by the lens array.

In the display unit, a reverse process of the above-described process of the elemental image producing unit may be performed. That is, the elemental images obtained by the elemental image producing unit may be displayed using the display device, and/or the displayed elemental images may be reproduced as a 3D image. The lens array may integrate the elemental images displayed using the display device, and/or may generate a 3D image.

In the integral imaging system according to example embodiments, a lens unit 100 (see FIG. 1 below) may be used as a lens array in order to form an image of an object and/or store the image in the imaging device or to form the image displayed on the display device as a 2D or 3D image and/or reproduce the same.

FIG. 1 is a schematic view illustrating a lens unit used in an integral imaging system according to example embodiments.

Referring to FIG. 1, the lens unit 100 (that may be, for example, a planar lens unit) may include first and second substrates 109 and 101, a liquid crystal layer 105 filled between the first and second substrates 109 and 101, an array of nanostructures 104, 106, and 107 that are grown to protrude from at least one of the first and second substrates 109 and 101, and/or first and second electrodes 108 and 103 respectively formed on the first and second substrates 109 and 101 to apply a voltage to the array of nanostructures 104, 106, and 107. As shown in FIG. 1, for example, the nanostructures 104, 106, and/or 107 may protrude from the first substrate 109.

The lens unit 100 may be formed to have a lens array having a 2D arrangement when a voltage is applied to the nanostructures 104, 106, and 107. That is, the lens array having a 2D arrangement may be formed when a voltage is applied to the array of nanostructures 104, 106, and 107, an electrical field may be generated according to the applied voltage, the arrangement of liquid crystal molecules may be varied, and/or a distribution of a refractive index may be generated, thereby realizing integral imaging. Here, as will be described later in more detail, the lens unit 100 may function as a lens array by applying a voltage to the array of nanostructures 104, 106, and 107 in order to form a refractive index distribution according to the distribution of the electrical field in the liquid crystal layer 105. Also, by adjusting the applied voltage, focal lengths of the unit lenses may be adjusted. Also, by not applying a voltage to the array of nanostructures 104, 106, and 107, the liquid crystal layer 105 may have a uniform refractive index distribution and/or the lens unit 100 may be controlled not to function as a lens array. Thus, the lens unit 100 may operate as an active lens array.

One or both of the first and second substrates 109 and 101 may be transparent substrates that transmit incident light through first substrate 109 and/or second substrate 101.

Figure 2:
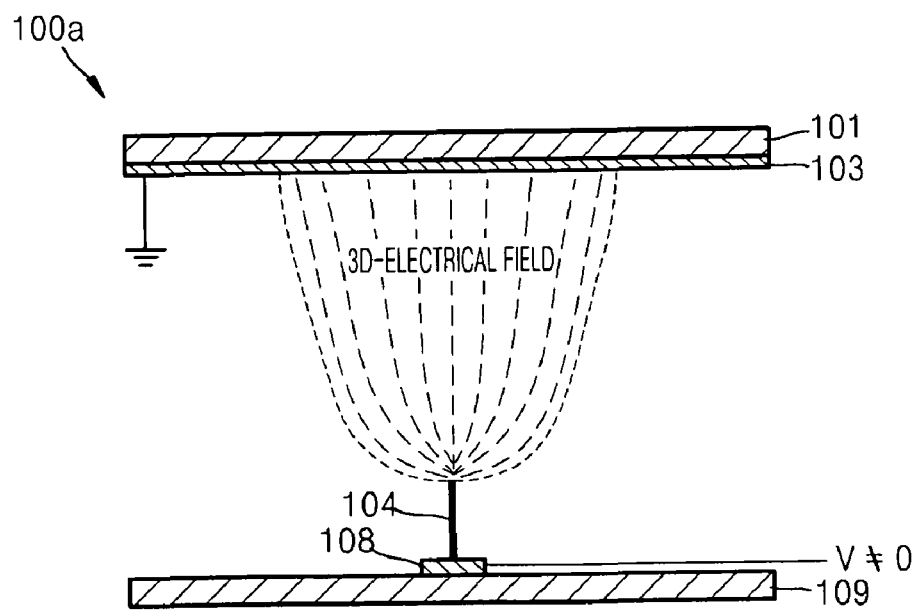
FIG. 2 is a schematic view illustrating an example distribution of an electrical field formed when a voltage is applied to nanostructures of a lens cell area of FIG. 1 (a second electrode is grounded and a voltage V (V≠0) is applied to a first electrode)

The first electrode 108 may be formed on an inner surface of the first substrate 109 in order to apply a voltage to the array of nanostructures 104, 106, and 107 of the nanostructure array. The first electrode 108 may be patterned so as to individually adjust voltages applied to each nanostructure of the array of nanostructures 104, 106, and 107. The second electrode 103 may be formed on an inner surface of the second substrate 101. The second electrode 103 may be patterned such that the second electrode 103 is coupled to the first electrode 108 in order to apply voltages to the array of nanostructures 104, 106, and 107 and/or to thereby partition lens cell areas 100a, 100b, and 100c of a lens array that may be formed virtually in the lens unit 100. As shown in FIGS. 2 through 4, the second electrode 103 may be grounded and/or one or more voltages may be selectively applied to the nanostructures 104, 106, and/or 107.

Each nanostructure of the array of nanostructures 104, 106, and 107 may be vertically grown on the first electrode 108 that may be patterned on the first substrate 109, thereby forming a distribution of an electrical field in the liquid crystal layer 105 by a voltage applied to the first electrode 108. One or more of the nanostructures 104, 106, and 107 may be nanotubes. In other words, one or more nanostructures of the array of nanostructures 104, 106, and 107 may be formed, for example, of multiwall carbon nanotubes (MWCNT). In addition or in the alternative, one or more nanostructures of the array of nanostructures 104, 106, and 107 may be formed of a sharp shape, such as a metal nanotip.

As described above, the first and second electrodes 108 and 103 and/or the array of nanostructures 104, 106, and 107 of the lens unit 100 may form a lens array having a 2D arrangement when a voltage is applied to the nanostructures 104, 106, and 107.

FIG. 2 is a schematic view illustrating an example distribution of an electrical field formed when a voltage is applied to the nanostructure 104 in the lens cell area 100a of FIG. 1, wherein the second electrode 103 is grounded and a voltage V (V≠0) is applied to the first electrode 108. The electrical field may be distributed in a 3D distribution that is approximately similar to a hemisphere around the nanostructure 104.

Figure 3A:
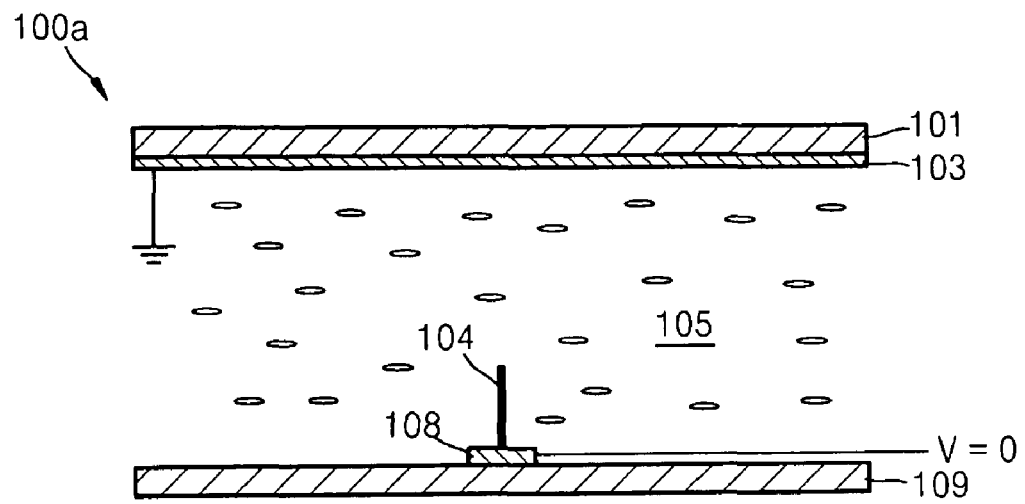
FIGS. 3A and 3B are schematic views illustrating variations in liquid crystal arrangement of a liquid crystal layer by applying a voltage or not applying a voltage to a nanostructure of a lens cell area, respectively.
Figure 3B:
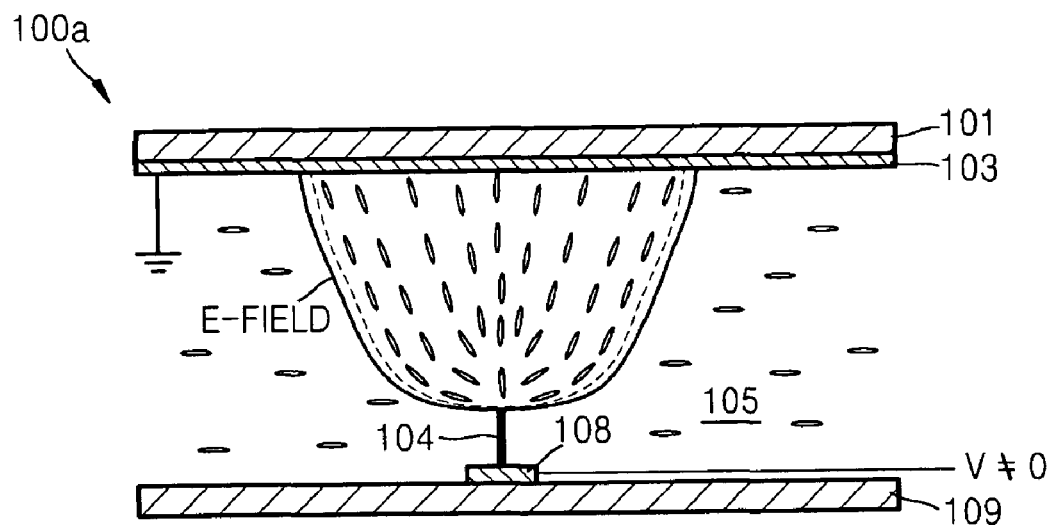
Figure 4:
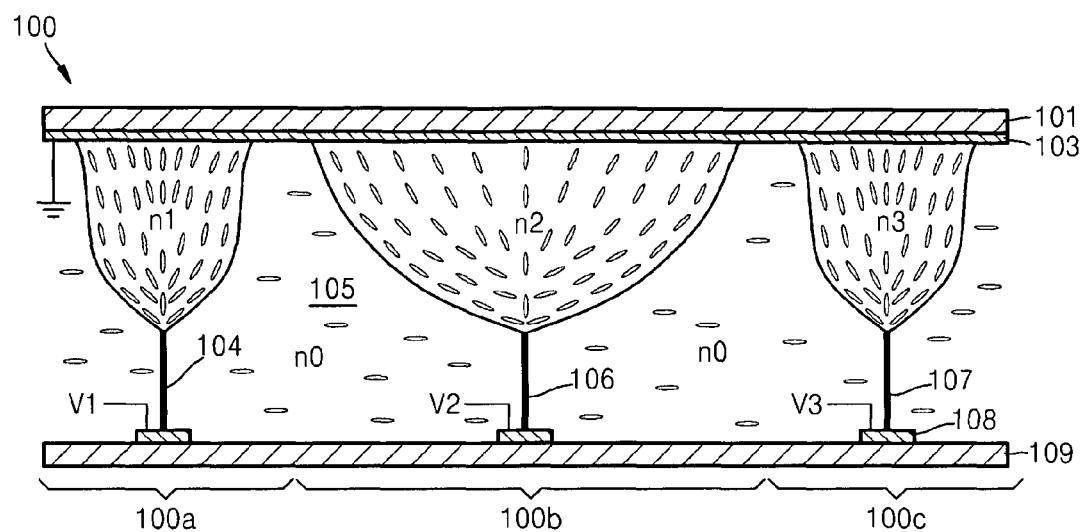
FIG. 4 is a schematic view illustrating variations in a liquid crystal arrangement of a liquid crystal layer when different voltages are applied to at least some portions of nanostructures through a first electrode located in each lens cell area of the lens unit of FIG. 1.
Figure 5:
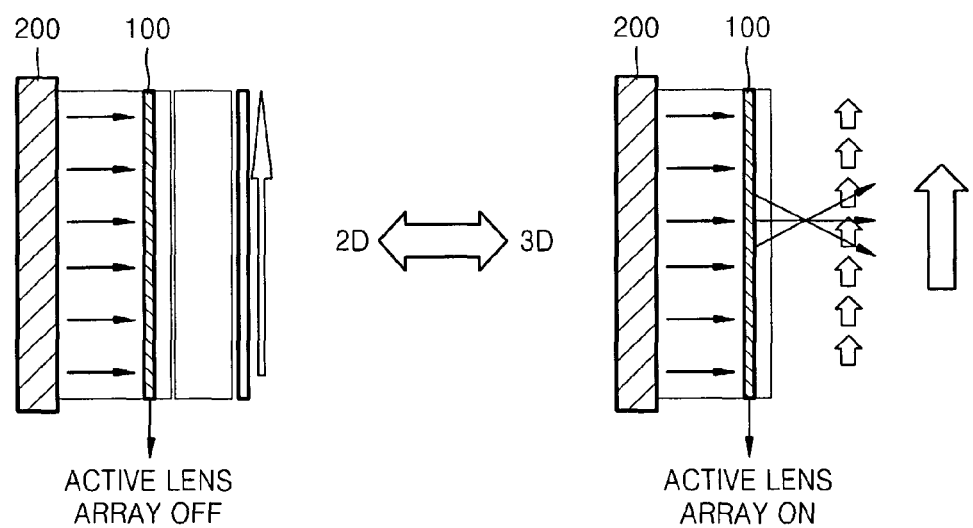
FIG. 5 is a schematic view illustrating switching between a two dimensional (2D) image and a three dimensional (3D) image when a lens unit according to example embodiments is applied to a display unit of an integral imaging system.

FIGS. 3A and 3B are schematic views illustrating variations in liquid crystal arrangement of the liquid crystal layer 105 by applying a voltage or not applying a voltage, respectively, to the nanostructure 104 of the lens cell area 100a. FIG. 3A illustrates a liquid crystal arrangement of the liquid crystal layer 105 when no voltage is applied to the nanostructure 104 (V=0). FIG. 3B illustrates a liquid crystal arrangement of the liquid crystal layer 105 when a voltage is applied to the nanostructure 104 (V≠0). FIG. 4 is a schematic view illustrating variations in a liquid crystal arrangement of a liquid crystal layer when different voltages are applied to at least some portions of nanostructures through a first electrode located in each lens cell area of the lens unit of FIG. 1. FIG. 5 is a schematic view illustrating switching between a two dimensional (2D) image and a three dimensional (3D) image when a lens unit according to example embodiments is applied to a display unit of an integral imaging system.

When no voltage is applied to the nanostructure 104 as in FIG. 3A, an electrical field distribution may not be formed in the liquid crystal layer 105. As a result, the liquid crystal layer 105 may have, for example, a uniform liquid crystal arrangement and/or a refractive index of the liquid crystal layer 105 may not change according to positions. Thus, the lens unit 100 may not function as a lens and/or as a lens array and instead, may transmit incident light without any change in refractive power.

When a voltage is applied to the nanostructure 104 as in FIG. 3B (V≠0), a 3D electrical field may be distributed in a shape similar to a hemisphere around the nanostructure 104, and/or the liquid crystal arrangement may be changed according to the distribution of the electrical field. Accordingly, the liquid crystal arrangement may differ in an area of the electrical field and/or in areas other than the electrical field, and/or the distribution of the refractive index of the liquid crystal layer 105 may change accordingly.

The electrical field may be distributed three-dimensionally and/or may approximate a hemisphere. The liquid crystals may be arranged according to the distribution of the electrical field. Thus, a refractive index of the area of the electrical field may be different from that of the area where no electrical field is formed. In addition, the area of the electrical field that is formed as an approximate hemisphere may form a virtual lens, for example, in the form of a plane-convex lens. Thus, light transmitted through the lens unit 100 may be formed as an image by the virtual lens. The intensity of the electrical field generated by the nanostructure 104 may vary according to the amplitude of the applied voltage and/or the arrangement of the liquid crystal molecules may be varied according to the intensity of the electrical field. Thus, variation values of the refractive index may vary accordingly. As a result, by adjusting the amplitude of the applied voltage, a focal length of the virtual lens obtained by the liquid crystal molecule arrangement due to the distribution of the electrical field may vary.

Thus, when a voltage is applied to the nanostructures 104, 106, and 107, the lens unit 100 may function as a lens array, an elemental image displayed by the display device may be integrated to generate a 3D image, and/or an image of a 3D object may be formed as an elemental image.

In the integral imaging system according to example embodiments, formation of a lens array in the lens unit 100 may be switched by applying, or not applying, a voltage through the first and second electrodes 108 and 103, thereby turning a distribution of a refractive index on and off electrically. Thus, as illustrated in FIG. 5, when the lens unit 100 is used in the display unit, and when no voltage is applied to the array of nanostructures 104, 106, and 107, a 2D incident image displayed on a display device 200 may be transmitted through the display device without any change, thereby forming a 2D image. On the other hand, when a voltage is applied to the array of nanostructures 104, 106, and 107, a 3D image may be reproduced from an elemental image displayed on the display device 200. Also, when the lens unit 100 is applied to the elemental image producing unit, and when no voltage is applied to the array of nanostructures 104, 106, and 107, the lens unit 100 may not function as a lens array. Thus a 2D image is recorded. When a voltage is applied to the array of nanostructures 104, 106, and 107, the lens unit 100 may function as a lens array and/or may form an image of a subject so as to store the image as an elemental image in the imaging device.

As described above, the integral imaging system according to example embodiments may alternately record or display a 2D image or a 3D image, thereby realizing a 2D/3D switchable integral imaging system.

Meanwhile, at least one of the first and second electrodes 108 and 103 may be formed to individually adjust a voltage applied to each of the nanostructures 104, 106, and 107. When the nanostructures 104, 106, and 107 are vertically grown on the first substrate 109 as illustrated in FIG. 1, the first electrode 108 may be formed so as to individually adjust voltages applied to the nanostructures 104, 106, and 107.

In this case, as shown in FIG. 4, when at least some of different voltages V1, V2, and V3 through the first electrode 108 located in each of the lens cell areas 100a, 100b, and 100c of FIG. 1 are applied to the nanostructures 104, 106, and 107, a distribution of an electrical field may vary in at least some of the nanostructures 104, 106, and 107. Thus, variation values of the refractive index obtained by the liquid crystal molecule arrangement due to the distribution of the electrical field may vary, and/or a focal length of a virtual lens formed in each of the lens cell areas 100a, 100b, and 100c may vary accordingly. FIG. 4 illustrates a case in which a refractive index obtained by the liquid crystal arrangement in an area where no electrical field is distributed is n0, and in which refractive indices of n1, n2, and n3 are obtained by the variation of the liquid crystal molecule arrangement according to the distribution of electrical fields as voltages V1, V2, and V3 may be respectively applied to the nanostructures 104, 106, and 107. In example embodiments, V1 may be equal to V3 and/or n1 may be equal to n3.

Figure 6:
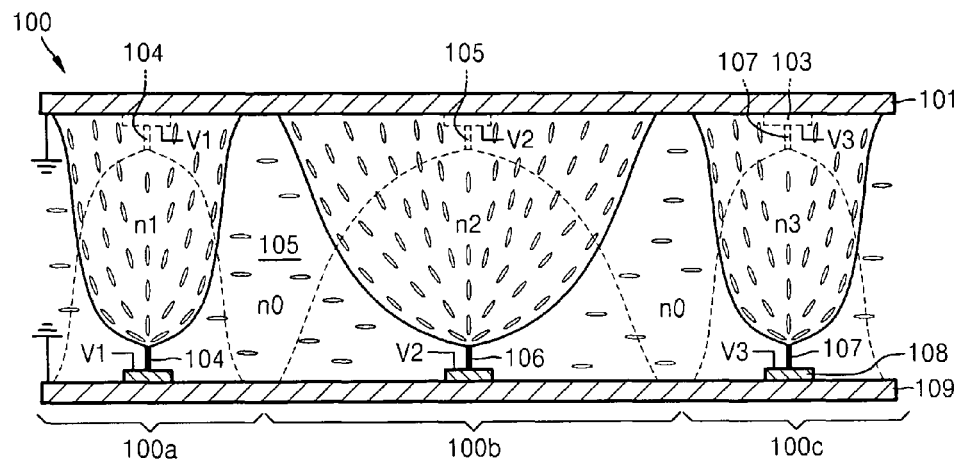
FIG. 6 is a schematic view illustrating variations in a liquid crystal arrangement of a liquid crystal layer when different voltages are applied to at least some portions of nanostructures through a first electrode or a second electrode located in each lens cell area of a lens unit similar to that of FIG. 1.
Figure 7:
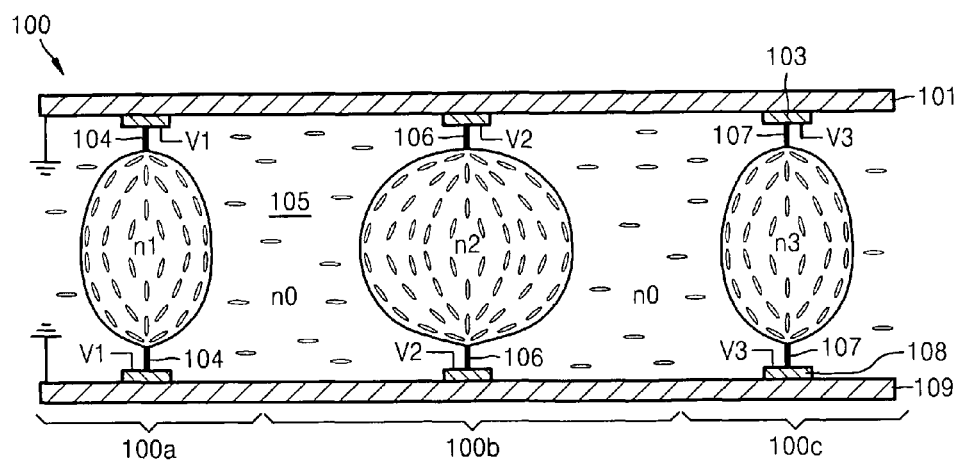
FIG. 7 is a schematic view illustrating variations in a liquid crystal arrangement of a liquid crystal layer when different voltages are applied to at least some portions of nanostructures through a first electrode and a second electrode located in each lens cell area of a lens unit similar to that of FIG. 1.

FIG. 6 is a schematic view illustrating variations in a liquid crystal arrangement of a liquid crystal layer when different voltages are applied to at least some portions of nanostructures through a first electrode or a second electrode located in each lens cell area of a lens unit similar to that of FIG. 1. FIG. 7 is a schematic view illustrating variations in a liquid crystal arrangement of a liquid crystal layer when different voltages are applied to at least some portions of nanostructures through a first electrode and a second electrode located in each lens cell area of a lens unit similar to that of FIG. 1.

Referring to FIGS. 6 and 7, the lens unit 100 (that may be, for example, a planar lens unit) may include first and second substrates 109 and 101, a liquid crystal layer 105 filled between the first and second substrates 109 and 101, an array of nanostructures 104, 106, and 107 that are grown to protrude from the first and second substrates 109 and 101, and/or first and second electrodes 108 and 103 respectively formed on the first and second substrates 109 and 101 to apply a voltage to the array of nanostructures 104, 106, and 107. As shown in FIG. 6, for example, the nanostructures 104, 106, and/or 107 may protrude from the first substrate 109 and the second substrate 101.

The lens unit 100 may be formed to have a lens array having a 2D arrangement when a voltage is applied to the nanostructures 104, 106, and 107. That is, the lens array having a 2D arrangement may be formed when a voltage is applied to the array of nanostructures 104, 106, and 107, an electrical field may be generated according to the applied voltage, the arrangement of liquid crystal molecules may be varied, and/or a distribution of a refractive index may be generated, thereby realizing integral imaging. The lens unit 100 may function as a lens array by applying a voltage to the array of nanostructures 104, 106, and 107 in order to form a refractive index distribution according to the distribution of the electrical field in the liquid crystal layer 105. Also, by adjusting the applied voltage, focal lengths of the unit lenses may be adjusted. Also, by not applying a voltage to the array of nanostructures 104, 106, and 107, the liquid crystal layer 105 may have a uniform refractive index distribution and/or the lens unit 100 may be controlled not to function as a lens array. Thus, the lens unit 100 may operate as an active lens array.

One or both of the first and second substrates 109 and 101 may be transparent substrates that transmit incident light through first substrate 109 and/or second substrate 101.

The first electrode 108 may be formed on an inner surface of the first substrate 109 and the second electrode 103 may be formed on an inner surface of the second substrate 101 in order to apply a voltage to the array of nanostructures 104, 106, and 107 of the nanostructure array. The first electrode 108 may be patterned so as to individually adjust voltages applied to each nanostructure of the array of nanostructures 104, 106, and 107 that are associated with the first electrode 108. The second electrode 103 may be patterned so as to individually adjust voltages applied to each nanostructure of the array of nanostructures 104, 106, and 107 associated with the second electrode 103. The first electrode 108 and/or the second electrode 103 may be patterned such that the first electrode 108 is coupled to the second electrode 103 in order to apply voltages to the respective arrays of nanostructures 104, 106, and 107 and/or to thereby partition lens cell areas 100a, 100b, and 100c of a lens array that may be formed virtually in the lens unit 100. As shown in FIGS. 6 and 7, the first electrode 108 may be grounded, the second electrode 103 may be grounded, and/or one or more voltages may be selectively applied to the nanostructures 104, 106, and/or 107 associated with the first electrode 108, associated with the second electrode 103, or associated with the first electrode 108 and associated with the second electrode 103.

Each nanostructure of the array of nanostructures 104, 106, and 107, associated with the first electrode 108, may be vertically grown on the first electrode 108 that may be patterned on the first substrate 109, thereby forming a distribution of an electrical field in the liquid crystal layer 105 by a voltage applied to the first electrode 108. Similarly, each nanostructure of the array of nanostructures 104, 106, and 107, associated with the second electrode 103, may be vertically grown on the second electrode 103 that may be patterned on the second substrate 101, thereby forming a distribution of an electrical field in the liquid crystal layer 105 by a voltage applied to the second electrode 103. One or more of the nanostructures 104, 106, and 107 may be nanotubes. In other words, one or more nanostructures of the array of nanostructures 104, 106, and 107 may be formed, for example, of multiwall carbon nanotubes (MWCNT). In addition or in the alternative, one or more nanostructures of the array of nanostructures 104, 106, and 107 may be formed of a sharp shape, such as a metal nanotip.

As described above, the first electrode 108, the second electrode 103, and/or the array of nanostructures 104, 106, and 107 of the lens unit 100 may form a lens array having a 2D arrangement when a voltage is applied to the nanostructures 104, 106, and 107.

As described above, by individually adjusting the voltage applied to each of the nanostructures 104, 106, and 107, the intensity of electrical fields generated by the nanostructures 104, 106, and 107 may vary. Accordingly, the distribution of the liquid crystal molecule arrangement may vary according to the intensity of the electrical fields and/or variation values of the refractive index vary according to the liquid crystal molecule arrangement. Thus, a lens array having different focal lengths, that is, optimum focal lengths, according to positions may be formed using the above characteristics. Accordingly, focal lengths of lens elements of the lens array may be adjusted to be proportional to the distance from a subject or a reproduced 3D image, thereby preventing image blurring when using the integral imaging method. That is, when an object is a 3D object, a distance between the object and the lens array may vary according to positions on the object. Here, when the focal lengths of the lens elements of the lens array are adjusted according to the distance between the positions on the object and the lens array, an optimum image may be formed without image blurring. Accordingly, the problem of a narrow viewing zone for a 3D image due to image blurring caused when an integral image is formed, using a lens array with a fixed focal length, may be prevented.

According to the integral imaging system of example embodiments, the lens unit may be used as a lens array having a 2D lens arrangement, the focal length of the lens array may be adjustable, and/or the quality of 3D images may be improved.

While example embodiments have been particularly shown and described, it will be understood by those of ordinary skill in the art that various changes in form and details may be made therein without departing from the spirit and scope of the present invention as defined by the following claims.

What is claimed is:

1. An integral imaging system, comprising:
a lens unit;
wherein the lens unit includes:
    a first substrate;
    a second substrate;
    a first electrode on the first substrate;
    a second electrode on the second substrate;

a liquid crystal layer between the first and second substrates; and an array of nanostructures protruding from the first substrate into the liquid crystal layer;

wherein the first and second electrodes are configured to apply one or more voltages to the array of nanostructures, and wherein when the one or more voltages are applied to the array of nanostructures, one or more electric fields are formed between the array of nanostructures and the second electrode, varying an arrangement of molecules in the liquid crystal layer and forming a refractive index distribution in the liquid crystal layer.

2. The integral imaging system of claim 1, wherein the lens unit is a planar lens unit.

3. The integral imaging system of claim 1, wherein variation values of the refractive index distribution are adjusted by adjusting the one or more voltages applied to the array of nanostructures in order to form a lens array with optimum focal lengths according to a distance or distances from the lens array.

4. The integral imaging system of claim 1, wherein the array of nanostructures includes one or more multiwall carbon nanotubes (MWCNT).

5. The integral imaging system of claim 1, wherein the array of nanostructures includes one or more metal nanotips.

6. The integral imaging system of claim 1, wherein at least one of the first and second electrodes individually adjusts the one or more voltages applied to each of the nanostructures, so that a lens array is formed with optimum focal lengths according to a distance or distances from the lens array.

7. The integral imaging system of claim 1, wherein the refractive index distribution is varied by adjusting the one or more voltages applied to the array of nanostructures.

8. The integral imaging system of claim 1, wherein when the one or more voltages are not applied to the array of nanostructures, the lens unit is configured as a lens array to produce two dimensional (2D) images.

9. The integral imaging system of claim 1, wherein when the one or more voltages are applied to the array of nanostructures, the lens unit is configured as a lens array to produce three dimensional (3D) images.

10. The integral imaging system of claim 1, wherein when the one or more voltages are not applied to the array of nanostructures, the lens unit is configured as a lens array to produce two dimensional (2D) images, and wherein when the one or more voltages are applied to the array of nanostructures, the lens unit is configured as the lens array to produce three dimensional (3D) images.

11. The integral imaging system of claim 10, wherein the refractive index distribution is varied by adjusting the one or more voltages applied to the array of nanostructures.

12. The integral imaging system of claim 11, wherein adjusting the one or more voltages applied to the array of nanostructures changes a focal length of the lens array.

13. The integral imaging system of claim 1, wherein at least one of the first and second electrodes is configured to apply more than one voltage to the array of nanostructures.

14. The integral imaging system of claim 1, wherein at least one of the first and second electrodes is configured to apply a first voltage to a first lens cell area of the array of nanostructures, and to apply a second voltage to a second lens cell area of the array of nanostructures.

15. The integral imaging system of claim 14, wherein at least one of the first and second electrodes is configured to adjust the first voltage applied to the first lens cell area of the array of nanostructures, and to adjust the second voltage applied to the second lens cell area of the array of nanostructures.

16. The integral imaging system of claim 1, wherein the liquid crystal layer fills a gap between the first and second substrates not occupied by the first electrode, the second electrode, and the array of nanostructures.

17. The integral imaging system of claim 1, wherein one of the first and second electrodes is electrically grounded.

18. The integral imaging system of claim 1, wherein the first substrate is substantially flat, wherein the second substrate is substantially flat, and wherein the first substrate is substantially parallel to the second substrate.

19. An integral imaging system, comprising:

a lens unit;

wherein the lens unit includes:

a first substrate;

a second substrate;

a first electrode on the first substrate;

a second electrode on the second substrate;

a liquid crystal layer between the first and second substrates;

a first array of nanostructures protruding from the first substrate into the liquid crystal layer; and a second array of nanostructures protruding from the second substrate into the liquid crystal layer;

wherein the first and second electrodes are configured to apply one or more voltages to the first or second array of nanostructures, and wherein when the one or more voltages are applied to the first or second array of nanostructures, one or more electric fields are formed between the first array of nanostructures and the second electrode or between the second array of nanostructures and the first electrode, varying an arrangement of molecules in the liquid crystal layer and forming a refractive index distribution in the liquid crystal layer.

20. An integral imaging system, comprising:

a lens unit;

wherein the lens unit includes:

a first substrate;

a second substrate;

a first electrode on the first substrate;

a second electrode on the second substrate;

a liquid crystal layer between the first and second substrates;

a first array of nanostructures protruding from the first substrate into the liquid crystal layer; and a second array of nanostructures protruding from the second substrate into the liquid crystal layer;

wherein the first and second electrodes are configured to apply one or more voltages to the first and second arrays of nanostructures, and wherein when the one or more voltages are applied to the first and second arrays of nanostructures, one or more electric fields are formed between the first array of nanostructures and the second array of nanostructures, varying an arrangement of molecules in the liquid crystal layer and forming a refractive index distribution in the liquid crystal layer.

* * * * *